United States Patent

Wesner

[15] 3,676,648
[45] July 11, 1972

[54] TURN HEEL LIMITING CIRCUIT

[72] Inventor: Charles R. Wesner, Crozet, Va.
[73] Assignee: Sperry Rand Corporation
[22] Filed: May 4, 1971
[21] Appl. No.: 140,168

[52] U.S. Cl. .................. 235/150.2, 114/144 R, 235/150.2, 318/588
[51] Int. Cl. .................. B63h 25/04, G05b 13/02
[58] Field of Search ........... 235/150.2, 150.24; 307/237; 318/580, 586, 588, 619; 323/9; 340/30, 53; 114/144 R

[56] References Cited

UNITED STATES PATENTS

| | | | |
|---|---|---|---|
| 3,604,907 | 9/1971 | Wesner | 235/150.2 |
| 3,431,475 | 3/1969 | Wesner | 318/588 X |
| 3,596,163 | 7/1971 | Barrett | 318/588 |
| 3,517,285 | 6/1970 | Kundler | 318/588 |
| 3,571,684 | 3/1971 | Mogens Ilsted Bech | 318/588 |
| 3,541,459 | 11/1970 | Webb | 307/237 X |

Primary Examiner—Eugene G. Botz
Assistant Examiner—Jerry Smith
Attorney—S. C. Yeaton

[57] ABSTRACT

Heeling of a ship during a turning maneuver is restricted to a safe value in accordance with the ship's speed and heading rate. A limit computer accepts a signal indicative of the ship's speed and provides a rudder angle limiting signal which is a function of the reciprocal of the square of the ship's speed. The polarity of a second signal representing the rate-of-change of the ship's heading is used to limit only those rudder angles that would decrease the turning radius. Rudder order command signals are ordinarily applied to the ship's steering mechanism without alterations. A command signal calling for an excessive rudder angle, however, is limited to the value of the rudder angle limiting signal.

6 Claims, 1 Drawing Figure

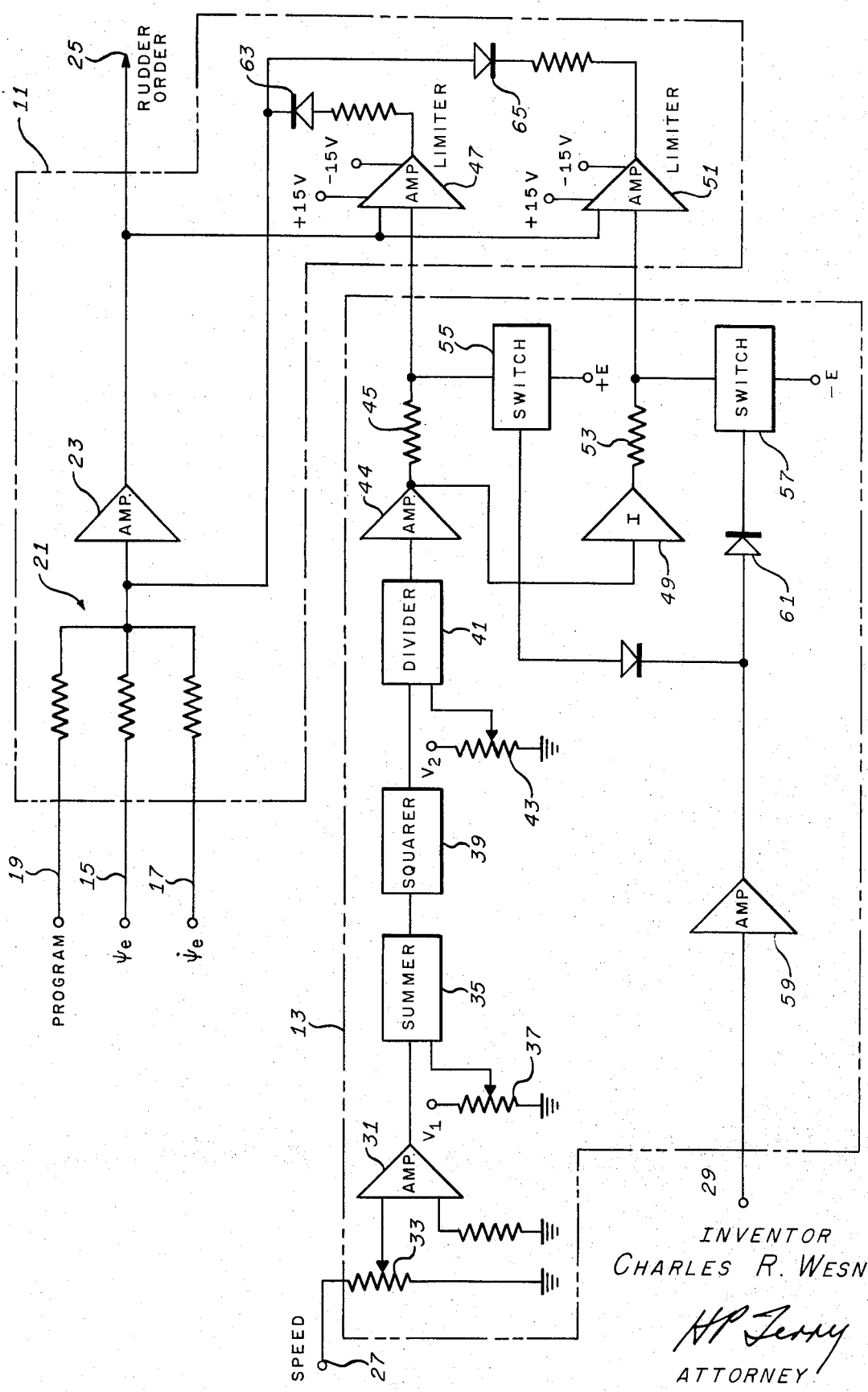

TURN HEEL LIMITING CIRCUIT

BACKGROUND OF THE INVENTION

1. Field of the Invention

The invention relates to ship's steering systems and more specifically to apparatus for limiting the rate-of-turn of marine craft to a safe value.

2. Description of the Prior Art

Modern cargo vessels operate at high speeds so that severe heeling may occur if a command signal for an excessive turn rate is inadvertently applied. Fixed or manually adjustable rudder limiting devices are known in the art. However, such devices do not compensate for changes in ship's speed or they must be manually reset to accommodate such changes.

SUMMARY OF THE INVENTION

The reciprocal of speed squared is used as a measure of the maximum safe turning rate of a vessel. A threshold is established in accordance with the vessel's speed. Rudder angles tending to increase the rate-of-turn are limited to a value corresponding to the threshold. Rudder angles tending to decrease the rate-of-turn are not restricted.

BRIEF DESCRIPTION OF THE DRAWING

The sole FIGURE is a functional block diagram illustrating the principles of the invention.

DESCRIPTION OF THE PREFERRED EMBODIMENT

Excessive heeling in marine craft may occur because of the centrifugal force developed during turning maneuvers. The angle of heel in such situations is proportional to the ship's speed and the rate-of-turn of the vessel. The rate-of-turn is proportional to the ship's speed and the rudder angle.

Combining these observations, it can be stated that for a given angle of heel, the maximum permissible rudder angle is proportional to the reciprocal of the ship's speed squared. The present invention makes use of this relationship by limiting the rudder angle in accordance with the maximum desired angle of heel and the speed of the vessel.

A circuit for accomplishing this purpose is illustrated in the accompanying drawing. The circuit includes a rudder order computer 11 and a rudder limit computer 13. Signals representing the heading error and the heading error rate-of-change are applied to input terminals 15 and 17 respectively. In addition, a programmed course may be inserted into the device through a third input 19 if so desired. The signals applied to the aforementioned input terminals are summed in a circuit 21, amplified in an amplifier 23 and appear as a rudder order signal at an output terminal 25. The rudder order signal thus is an electrical signal typically having zero value when the rudder is to be maintained amidships. A rudder order signal of one polarity serves to turn the rudder to port and a signal of the opposite polarity serves to turn a rudder to starboard. Electrically actuated steering mechanisms capable of accepting such electrical signals are well known in the art.

Under normal conditions, the output signal from the summing circuit 21 is applied directly to the rudder order output terminal 25 through the amplifier 23 without modification. Excessive command signals, however, are modified by means of the circuit of the invention as will be explained.

Additional input signals are applied to the limit computer 13. These include an input signal representative of the speed of the vessel which is applied to an input terminal 27 and a heading rate signal which is applied to an input terminal 29.

The speed signal typically may be derived from a tachometer driven by the propeller shaft of the vessel. The various heading and heading rate signals may typically be derived from the gyrocompass or other navigation instruments aboard the ship.

The signal representing the speed of the vessel is applied to a conventional amplifier 31 through a potentiometer 33. The output of the amplifier 31 is applied to a summer 35. A steady d.c. voltage may be added to the summer 35 by means of a potentiometer 37 if desired. The output of the summer 35 is squared in a conventional squaring circuit 39 and applied to a divider circuit 41. The divider circuit also receives a voltage from a potentiometer 43 and serves to divide the value of the voltage from the potentiometer 43 by the value of the signal from the squarer 39.

Each of the foregoing circuits 35, 39 and 41 are conventional. Suitable circuits are illustrated, for instance, in Korn & Korn, "Electronic Analog and Hybrid Computers", McGraw-Hill Book Company, New York, 1964.

In many instances, the potentiometer 33 may be set to the full value and the potentiometer 37 may be set at essentially zero value so that the output of the summer 35 is a signal representing the speed of the vessel and the output of the squarer 39 is a signal representing the square of the speed of the vessel. The potentiometer 43 is set in accordance with the maximum heel which is desired. Thus the output of the divider 41 is a signal representing the ratio of the maximum heel to be tolerated, divided by the square of the speed of the ship. As explained earlier, this value represents the maximum rudder angle that can be tolerated at a given speed.

In some instances it may be desired to add a constant to the value of the signal from the amplifier 31. This may be done by introducing a finite voltage by means of the potentiometer 37 which serves to make the characteristic curve of the limit computer circuit more linear.

The output of the divider 41 is applied through an amplifier 44 and a series resistor 45 to a limiter amplifier 47 in the order computer circuit 11. The output of the amplifier 44 is also inverted in a conventional inverting circuit 49 and applied to a second limiter amplifier 51 through a series resistor 53. The output ends of the resistors 45 and 53 are coupled to positive and negative voltages, +E and −E respectively, through switches 55 and 57. The values of the voltages +E and −E are established to be sufficient to permit full rudder displacement.

The switches 55 and 57 are actuated in accordance with signals applied to the input terminal 29 through the amplifier 59. The signals applied to the input terminal 29 represent rate-of-change of ship's heading. The amplifier 59 is so arranged that with no rate-of-change of heading substantially zero voltage appears at the output of the amplifier. In the presence of a finite heading change, an output signal appears at the output of the amplifier 59 having a polarity indicative of the sense of the rate-of-change of heading. For a change in heading which provides a positive output voltage from the amplifier 59, a signal is applied through a first diode 61 to close the switch 57 and thus clamp the input of the limiter amplifier 51 to the −E level. The same signal leaves the switch 55 open and thus permits any signal from the amplifier 44 to be applied to the limiter amplifier 47. Conversely, a change in heading which produces a negative output signal on the amplifier 59 closes the switch 55 so as to place a voltage equal to +E on the input terminal of the limiter amplifier 47 and to leave the limiter amplifier 51 unaffected.

In brief, the limit computer 13 serves to provide a limit threshold voltage to one or the other of the limiter amplifiers 47 and 51 depending upon the sense of the rate-of-change of heading. The magnitude of the limiting signal depends upon the ship's speed.

Assume now, that the limiter amplifier 47 receives a signal from the amplifier 44 and the switch 57 is closed so that a −E voltage is applied to the amplifier 51.

The limiter amplifier 47 also receives a signal from the output of the amplifier 23 which represents the rudder order signal being applied to the output terminal 25. The amplifier 47 is connected so that a rise in voltage from the amplifier 23 causes a corresponding rise in voltage at the output of the limiter amplifier 47. If now, the output of the amplifier 23 is less than the voltage applied from the amplifier 44, the output of the limiter 47 will be a negative voltage which is blocked by a diode 63. Under these conditions, the limiter amplifier 47 has no influence on the rudder order signal so that the full signal can be applied to the steering mechanism.

If, however, an excessive turn rate is commanded, a high output voltage will appear at the amplifier 23. This voltage will exceed the permissible level as determined by the output of the amplifier 44 and cause a positive output voltage to appear at the limiter amplifier 47. This positive voltage forward biases the diode 63 so as to clamp the input of the amplifier 23 to the level of the threshold voltage from the resistor 45.

Under the preceding assumed conditions, the sense of the heading rate-of-change signal has been such as to open the switch 55. Thus under these assumed conditions, the switch 57 would have been closed and a voltage equal to −E would have been applied to the limiter amplifier 51. In such a situation, the limiter amplifier 51 is ineffective and a command signal ordering a sharp reversal of the rudder would not be inhibited.

In the event of a rate-of-change of heading in the same sense, the switch 55 would be closed so as to apply a +E voltage to the limiter amplifier 47 thereby effectively disabling the limiter amplifier 47. The switch 57, however, remains open and a negative limit voltage is applied to the limiter amplifier 51. The amplifier 51 is so constructed that a rise or fall in the voltage applied to the limiter amplifier from the amplifier 23 causes a corresponding rise or fall in the output voltage from the limiter amplifier. So long as the voltage from the amplifier 23 remains less than the voltage from the limit computer 13, the output of the limiter amplifier remains positive and is blocked by a diode 65. If, however, the voltage from the amplifier 23 exceeds the voltage applied to the limiter amplifier 51 from the limit computer 13, the output of the limiter amplifier becomes negative and forward biases the diode 65 so as to clamp the input of the amplifier 23 to the level of the output signal from the limiter amplifier 51, thus prohibiting excessive command signals from being applied to the output terminal 25.

It will be appreciated that the order computer 11 can be used with a variety of circuits for producing threshold signals. In some instances, for example, manual control may be desired. This can be accomplished by disconnecting the limit computer 13 and substituting a potentiometer or other means for applying a suitable positive voltage to one of the limiter amplifiers and by applying the same voltage through an inverter to the other limiter amplifier.

The order computer 11 provides exact tracking between the reference or threshold signal and the limited output signal. There is negligible offset between the reference and limited output signal. The threshold limit can be set anywhere within the normal signal range regardless of the polarity of the heading rate signal.

The limit computer 13 is advantageous in that it provides a relatively simple but accurate means for computing maximum permissible rudder angle without limiting the reverse angle of the rudder.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. Apparatus for limiting an output voltage to the value of a threshold voltage comprising first amplifying means for providing an output voltage in response to a received signal, first and second limiter amplifiers, means to establish positive and negative threshold voltages, said first and second limiter amplifiers being connected to receive said positive and negative threshold voltages respectively, said limiter amplifiers being further connected to compare the output signal from said first amplifying means with the appropriate threshold voltage, first and second diode means connected to clamp the input of said first amplifying means to the output of said first and second limiter amplifiers respectively whenever the output of said first amplifying means exceeds the corresponding threshold voltage.

2. The apparatus of claim 1 wherein the first diode means is connected between the output of said first limiter amplifier and the input of said first amplifying means and oriented to pass current from said limiter to said amplifying means and wherein said second diode means is connected between the output of said second limiter amplifier and the input of said first amplifying means and oriented to pass current from the first amplifying means to the limiter amplifier.

3. The apparatus of claim 2 wherein the output signal is a rudder order signal for setting the rudder angle of a marine craft and the received signals are functions of the craft heading.

4. The apparatus of claim 3 wherein the means to establish positive and negative thresholds is a rudder limit computer, said rudder limit computer including means to receive signals indicative of the craft's speed and signals indicative of the rate-of-change of heading of the craft, said rudder limit computer including means to provide a first threshold signal having a magnitude that is a function of the reciprocal of a square of the craft's speed, and means to invert the threshold voltage, said rudder limit computer further including means responsive to the polarity of said rate-of-change of heading signal for coupling the direct or the inverted threshold signal to said first or second limiter amplifier respectively.

5. The apparatus of claim 4 wherein the means to provide the first threshold signal includes a squaring circuit connected to receive a signal representative of the craft speed and a divider circuit, said divider circuit being connected to receive a d.c. voltage representative of the selected maximum heel angle and a signal from said squaring circuit, said divider circuit being arranged to provide an output signal representative of the ratio of said d.c. voltage to the signal from said squaring circuit.

6. The apparatus of claim 5 wherein the means responsive to the polarity of the rate-of-change of heading includes means for coupling said direct and inverted threshold signals through individual series resistors to said first and second limiter amplifiers respectively, first and second switching means for optionally connecting the output of individual series resistors to positive and negative voltage sources respectively, said voltage sources providing voltages representative of the maximum rudder angle, said switches being closed in response to negative and positive polarities of rate-of-change of heading signals respectively.

* * * * *